US011641101B2

(12) United States Patent
Berg et al.

(10) Patent No.: US 11,641,101 B2
(45) Date of Patent: May 2, 2023

(54) ARC FAULT INDUCED DIFFERENTIAL PROTECTION ISOLATION

(71) Applicant: Hamilton Sundstrand Corporation, Charlotte, NC (US)

(72) Inventors: Joshua Berg, Roscoe, IL (US); Jef William Good, German Valley, IL (US); John F. Defenbaugh, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 104 days.

(21) Appl. No.: 17/221,481

(22) Filed: Apr. 2, 2021

(65) Prior Publication Data
US 2021/0320491 A1 Oct. 14, 2021

Related U.S. Application Data

(60) Provisional application No. 63/006,841, filed on Apr. 8, 2020.

(51) Int. Cl.
*H02H 7/06* (2006.01)
*H02H 1/00* (2006.01)

(52) U.S. Cl.
CPC ............ *H02H 7/06* (2013.01); *H02H 1/0015* (2013.01)

(58) Field of Classification Search
CPC .......... H02H 7/06; H02H 7/26; H02H 1/0015; H02H 3/042; H02J 9/04; H02J 2310/44
See application file for complete search history.

(56) References Cited

U.S. PATENT DOCUMENTS

| 5,400,205 | A | * | 3/1995 | Ligon | .................... H02H 7/266 361/65 |
| 5,488,532 | A | | 1/1996 | Mrowiec et al. | |
| 5,594,285 | A | | 1/1997 | Wisbey et al. | |
| 7,292,011 | B2 | | 11/2007 | Beneditz | |
| 7,508,638 | B2 | | 3/2009 | Hooper | |
| 7,626,798 | B2 | | 12/2009 | Rusan et al. | |
| 8,947,837 | B2 | | 2/2015 | Novakovic et al. | |
| 10,432,120 | B2 | * | 10/2019 | Maddali | .................... H02P 9/10 |
| 2009/0189455 | A1 | * | 7/2009 | Rusan | ....................... H02J 9/06 307/82 |

(Continued)

FOREIGN PATENT DOCUMENTS

| EP | 2650996 A1 | 10/2013 |
| EP | 2651026 A2 | 10/2013 |

OTHER PUBLICATIONS

Extended European Search Report dated Sep. 16, 2021, issued during the prosecution of European Patent Application No. 21167394.2.

*Primary Examiner* — Scott Bauer
(74) *Attorney, Agent, or Firm* — Locke Lord LLP; Joshua L. Jones; Scott D. Wofsy

(57) ABSTRACT

A method includes detecting an initial fault in a system and opening a contactor to isolate a load bus from the system for a window of time. During the window of time, the method includes detecting whether current flows from a generator of the system. If current flows from the generator of the system during the window of time, the method includes isolating the load bus from the generator. If current does not flow from the generator to the system during the window of time, the method includes isolating the load bus from all sources including the generator.

15 Claims, 2 Drawing Sheets

(56) References Cited

U.S. PATENT DOCUMENTS

| | | | | |
|---|---|---|---|---|
| 2009/0190279 A1* | 7/2009 | Rusan | ............... | H02H 7/26 |
| | | | | 361/93.6 |
| 2014/0177120 A1* | 6/2014 | Zhang | ............... | H02H 3/025 |
| | | | | 361/93.9 |
| 2016/0365727 A1* | 12/2016 | Kam | ............... | H02J 3/26 |
| 2019/0229523 A1* | 7/2019 | Rostron | ............... | H02H 1/0007 |

* cited by examiner

ARC FAULT INDUCED DIFFERENTIAL PROTECTION ISOLATION

CROSS REFERENCE TO RELATED APPLICATIONS

This application claims priority to U.S. Provisional Patent No. 63/006,841, filed Apr. 8, 2020. The contents of this application are incorporated herein by reference.

BACKGROUND

1. Field

The present disclosure relates to power distribution, and more particularly to differential protection such as used in protecting aircraft electrical systems.

2. Description of Related Art

Many aircraft electrical systems include a differential protection to protect against short circuits, e.g., in the wing. However, arc faults in the electrical panel could cause an erroneous trip of this protection due to current transformer (CT) saturation. As this protection isolates the fault to the generating channel, the system would then allow other sources to connect to the panel fault, causing a cascading loss of sources.

Arc faults are rare and are difficult to test, so existing techniques have been acceptable in the past. With increasing scrutiny given to all aircraft systems, there is an ever present need for improved systems and methods for differential protection. This disclosure provides a solution for this need.

SUMMARY

A method includes detecting an initial fault in a system and opening a contactor to isolate a load bus from the system for a window of time. During the window of time, the method includes detecting whether current flows from a generator of the system. If current flows from the generator of the system during the window of time, the method includes isolating the load bus from the generator and allowing another source to power the load bus. If current does not flow from the generator to the system during the window of time, the method includes isolating the load bus from all sources including the generator.

The initial fault can be an arc fault in a generator feeder or a panel arc fault. The contactor can connect between a generator feeder line and a load bus. If current flows from the generator of the system during the window of time, the method can include isolating the load bus from the generator and connecting the load bus to a power source other than the generator.

The method can include keeping the generator online and running during the window of time, and deactivating the generator if current flows from the generator of the system during the window of time. The method can include re-connecting the generator to the load bus if the initial fault clears during the window of time.

A system includes a generator, a generator feed line connected to the generator, and a contactor selectively connecting between the generator feed line and a load bus. A protection system is connected to sense current generated by the generator and is connected to control the contactor. The protection system is configured for performing methods as described above.

The system can be onboard an aircraft, wherein the generator is located on a wing of the aircraft, and wherein the load bus is located a main fuselage of the aircraft. The load bus can be connected to multiple zones, which can remain powered even if a single one of the zones must be isolated for a fault. The load bus can include an electrical panel with respective individual fault protection for each one of the multiple zones. At least one power source can be selectively connectable to the load bus if the generator is isolated from the load bus.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
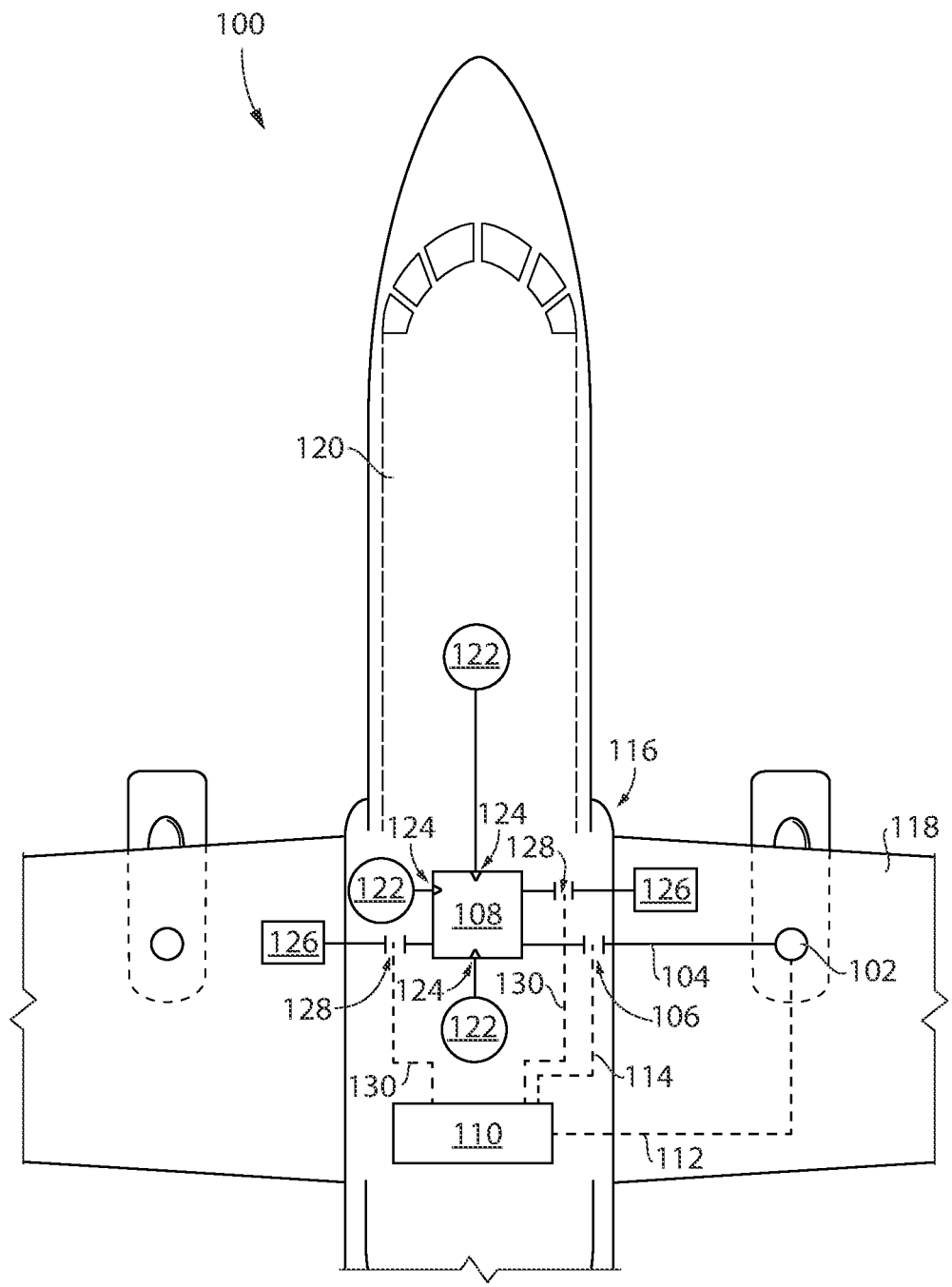
FIG. 1 is a schematic perspective view of an embodiment of a system constructed in accordance with the present disclosure, showing the generator on a wing and the load bus in the fuselage of an aircraft.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIG. 2, as will be described. The systems and methods described herein can be used to isolating faults to a bus if there is an arc fault in an electrical panel that causes a trip of the differential protection. This can prevent cascading source trips from a single fault, e.g. on an aircraft.

The system 100 includes a generator 102, a generator feed line 104 connected to the generator 102, and a contactor 106 selectively connecting between the generator feed line 104 and a load bus 108. A protection system 110 is connected by line 112 to sense current generated by the generator 102 and is connected by line 114 to control the contactor 106. The protection system 110 is configured for performing methods as described below.

With continued reference to FIG. 1, the system 100 can be onboard an aircraft 116. The generator 102 can be located on a wing 118 of the aircraft 116. The load bus 108 is located in main fuselage 120 of the aircraft 116. The load bus 108 can be connected to multiple zones 122 where electrical equipment are located. FIG. 1 shows three zones 122, however those skilled in the art will readily appreciate that any suitable number of zones can be included. At least some of the zones 122 can remain powered even if a single one of the zones 122 must be fault isolated by load bus 108. The load bus 108 can include an electrical panel with respective individual fault protection 124 (which can include breakers, fuses, or the like) for each one of the multiple zones 122. At least one power source 126 can be selectively connectable to the load bus 108, e.g. by contactors 128, if the generator 102 is isolated from the load bus 108. The protection system 110 is connected by lines 130 to the respective power sources 126. FIG. 1 shows two power sources 126 in addition to the generator 102, however those skilled in the art will readily appreciate that any suitable number of power sources 126 can be included.

Figure 2:
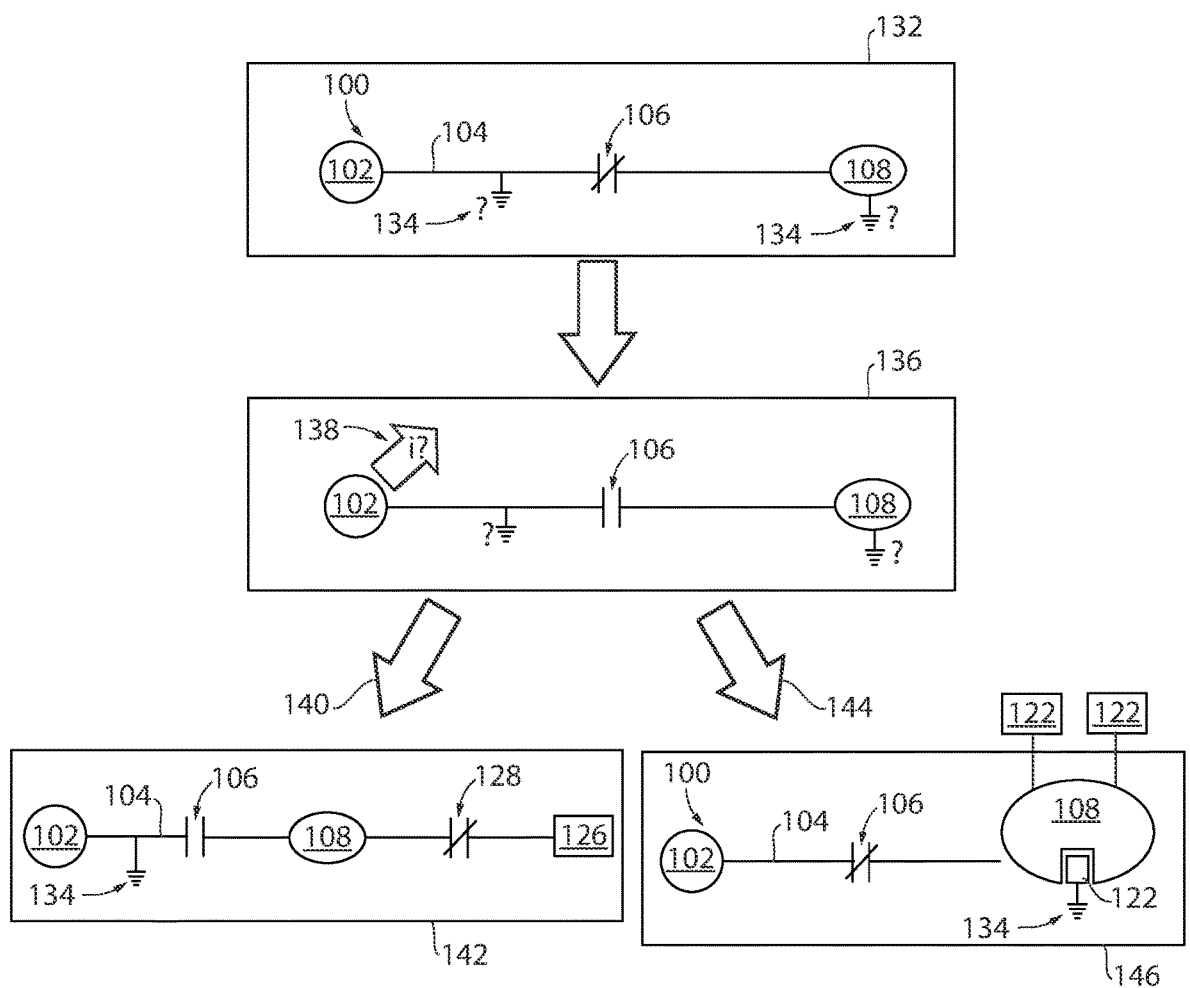
FIG. 2 is a diagram showing operation of the system of FIG. 1.

With reference now to FIG. 2, a method includes detecting an initial fault in a system 100 as indicated in box 132, where it is not yet determined whether the fault 134 is an arc fault in the generator feeder 104, an arc fault in the load bus 108, or a differential fault. As indicated in box 136, the method includes next opening the contactor 106 to isolate a load bus 108 from the system 100, specifically from the load bus 108 of the system 100, for a window of time. During the window of time, the protection system 110 can detect whether current flows from the generator 102, as indicated by arrow 138 in FIG. 2. If current flows from the generator of the system during the window of time, as indicated by arrow 140 and box 142 in FIG. 2, the method includes isolating the load bus 108 from the generator 102, i.e. keeping the contactor 106 open, because the fault is isolated as an arc in the generator feeder 104. In this event, the method can include connecting the loads of the load bus 108 to a power source other than the generator 102, e.g. any of power sources 126 of FIG. 1. The method can include keeping the generator 102 online and running during the window of time, and deactivating the generator 102 if current flows from the generator 102 during the window of time.

On the other hand as indicated in FIG. 2 with arrow 144 and box 146, if current does not flow from the generator 102, e.g. into the generator feed 104 of the system 100, during the window of time, then the method includes isolating the load bus 108 from all sources including the generator 102, as in isolation of the zone 122 that has the arc fault 134. The generator 102 can be reconnected to power other zones 122 of the load bus 108 that are not faulting. The method can also include re-connecting the generator 102 to the load bus 108 if the initial fault clears during the window of time.

The methods and systems of the present disclosure, as described above and shown in the drawings, provide for isolating faults to a bus if there is an arc fault in an electrical panel that causes a trip of the differential protection. This can prevent cascading source trips from a single fault, e.g. on an aircraft. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method comprising:
    detecting an initial fault in a system;
    opening a contactor to isolate a load bus from the system for a window of time;
    during the window of time, detecting whether current flows from a generator of the system; and
    if current flows from the generator of the system during the window of time, maintaining the load bus in an isolated state from the generator; and
    if current does not flow from the generator to the system during the window of time, isolating the load bus from a plurality of sources including the generator.

2. The method as recited in claim 1, wherein the initial fault is an arc fault in a generator feeder or a panel arc fault.

3. The method as recited in claim 1, wherein the contactor connects between a generator feeder line and a load bus.

4. The method as recited in claim 1, wherein if current flows from the generator of the system during the window of time, isolating the load bus from the generator and connecting the load bus to a power source other than the generator.

5. The method as recited in claim 1, further comprising keeping the generator online and running during the window of time, and deactivating the generator if current flows from the generator of the system during the window of time.

6. The method as recited in claim 1, further comprising re-connecting the generator to the load bus if the initial fault clears during the window of time.

7. A system comprising:
    a generator;
    a generator feed line connected to the generator;
    a contactor selectively connecting between the generator feed line and a load bus; and
    a protection system connected to sense current generated by the generator and connected to control the contactor, wherein the protection system is configured for:
    detecting an initial fault in the system;
    opening the contactor to isolate the load bus from the system for a window of time;
    during the window of time, detecting whether current flows from the generator; and
    if current flows from the generator during the window of time, isolating maintaining the load bus in an isolated state from the generator; and
    if current does not flow from the generator to the system during the window of time, isolating the load bus from a plurality of sources including the generator.

8. The system as recited in claim 7, wherein the initial fault is an arc fault in the generator feeder or a panel arc fault.

9. The system as recited in claim 7, wherein if current flows from the generator of the system during the window of time, the protection system is configured for isolating the load bus from the generator and connecting the load bus to a power source other than the generator.

10. The system as recited in claim 7, wherein if current flows from the generator of the system during the window of time, the protection system is configured for keeping the generator online and running during the window of time, and deactivating the generator if current flows from the generator of the system during the window of time.

11. The system as recited in claim 7, wherein if current flows from the generator of the system during the window of time, the protection system is configured for re-connecting the generator to the load bus if the initial fault clears during the window of time.

12. The system as recited in claim 7, wherein the system is onboard an aircraft, wherein the generator is located on a wing of the aircraft, and wherein the load bus is located a main fuselage of the aircraft.

13. The system as recited in claim 12, wherein the load bus is connected to multiple zones which can remain powered even if a single one of the zones must be isolated for a fault.

14. The system as recited in claim 13, wherein the load bus includes an electrical panel with respective individual fault protection for each one of the multiple zones.

15. The system as recited in claim 7, further comprising at least one power source selectively connectable to the load bus if the generator is isolated from the load bus.

\* \* \* \* \*